Patented Mar. 24, 1936

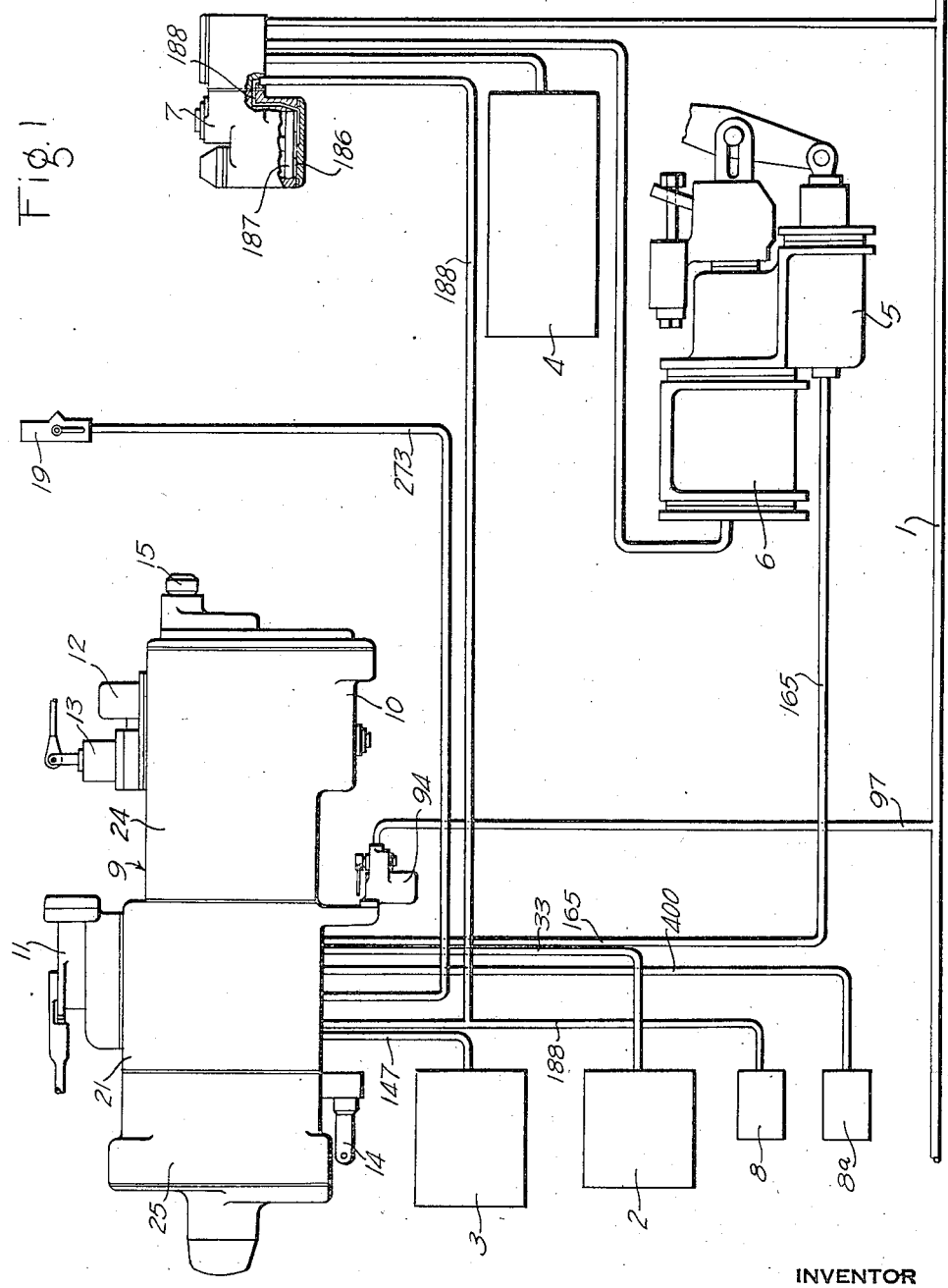

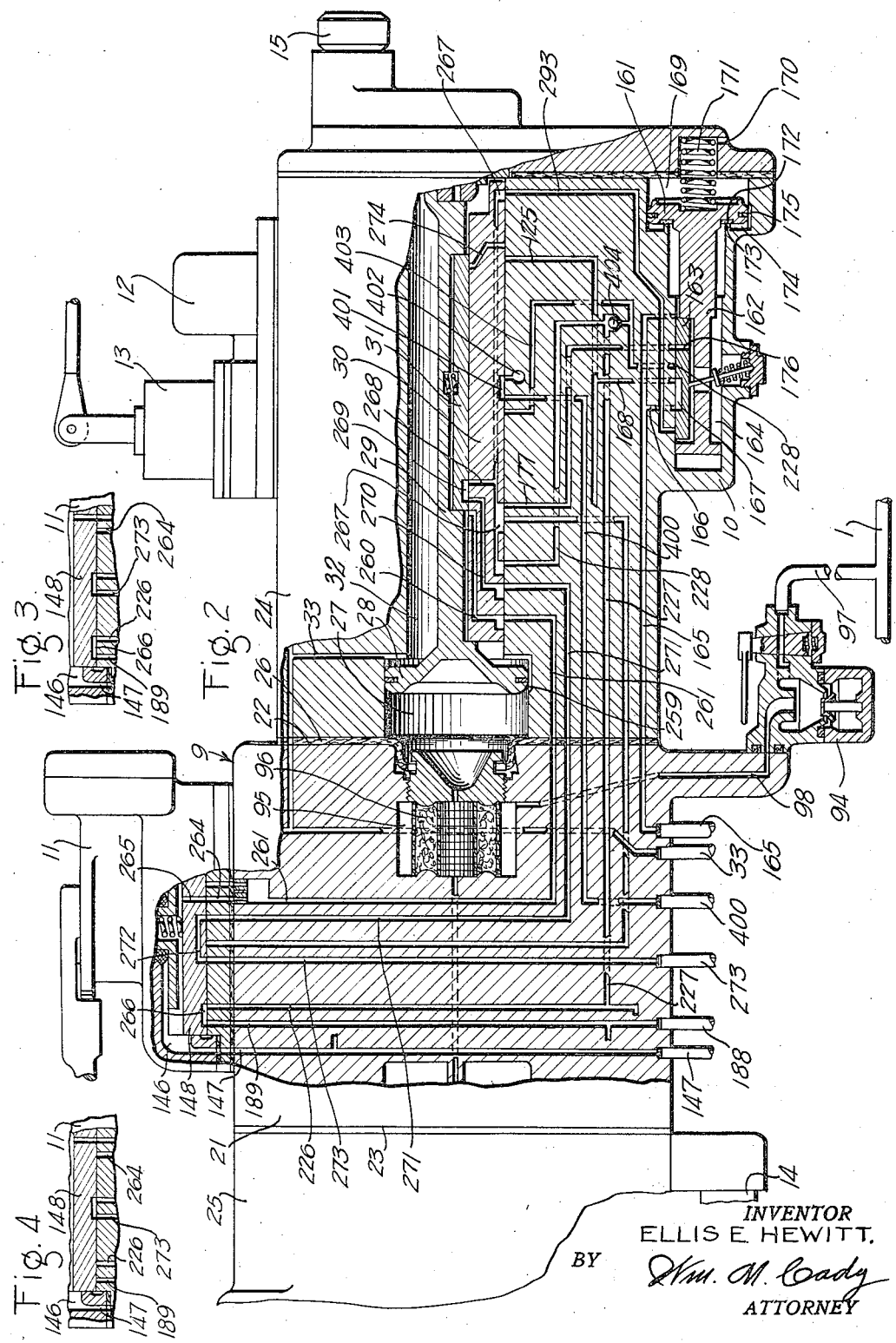

2,035,069

UNITED STATES PATENT OFFICE 2,035,069

FLUID PRESSURE BRAKE

Ellis E. Hewitt, Edgewood, Pa., assignor to The Westinghouse Air Brake Company, Wilmerding, Pa., a corporation of Pennsylvania Application November 3, 1934, Serial No. 751,341

12 Claims. (Cl. 303—43)

This invention relates to fluid pressure brakes and more particularly to a fluid pressure brake equipment which is operative upon a reduction in brake pipe pressure to effect an application of the brakes and upon an increase in brake pipe pressure to effect the release of the brakes.

In passenger train service, when the train is traveling at high speed and it is desired to bring it to a stop, it is customary to effect a heavy initial application of the brakes, then partially release the brakes, permitting the train to proceed with the brakes applied. Now when it is desired to finally bring the train to a stop, a reapplication of the brakes is effected and then the brakes are gradually released to insure a gentle stop. It will be understood that when the reapplication of the brakes is effected, the speed of the train will have been materially reduced, so that the brake cylinder pressure need only be increased five or ten pounds to insure the proper stop being accomplished.

It has been found that it may require as high as a five pound reduction in brake pipe pressure at the head end of the train to cause the several movable parts of the equalizing portions of the equipments at the rear end of the train to move to application position, so that when the brakes are partially released and such a reduction in brake pipe pressure is made to effect the reapplication of the brakes, the brake cylinder pressure will be increased about seventeen pounds. Such an increase, when the train speed has been materially reduced, is considerably in excess of that required and, furthermore, is objectionable in that it tends to produce excessive train shocks before the engineer can, by the manipulation of the brake valve device, cause a sufficient release of the brakes to prevent such action.

The principal object of the invention is to provide a fluid pressure brake equipment having means whereby the aforementioned objectionable feature is eliminated in effecting a reapplication of the brakes on top of a partially released application.

Another object of the invention is to provide a fluid pressure brake equipment of the type disclosed in an application of Clyde C. Farmer and myself, Serial No. 743,546, filed September 11, 1934, with means for controlling the degree of a reapplication of the brakes effected after a previous application has been partially released, and a further feature resides in the cutting out of such control by means of the change-over valve device of the equipment.

Other objects and advantages will appear in the following more detailed description of the invention.

In the accompanying drawings, Fig. 1 is a diagrammatic view of a fluid pressure brake equipment embodying the invention; Fig. 2 is an enlarged fragmentary sectional diagrammatic view of the same; Figs. 3 and 4 are fragmentary sectional views of the change-over valve device, Fig. 3 showing the device in position to condition the equipment for express train operations, and Fig. 4 showing the device in position to condition the equipment for freight train operations.

With the exceptions hereinafter fully pointed out, the fluid pressure brake equipment shown in the drawings is substantially identical with the equipment disclosed in the aforementioned pending application. In view of this, the parts of the equipment which correspond with those of the application will be indicated by the reference characters used in the pending application.

The equipment shown in the drawings is of the type adapted to be changed over or conditioned for different classes of railway train service and may comprise a brake pipe 1, an auxiliary reservoir 2, an emergency reservoir 3, a supply reservoir 4, a take-up cylinder device 5, a brake cylinder 6, a relay valve device 7, volume reservoirs 8 and 8ª, a brake controlling valve mechanism 9, a cut-in valve device 10, a change-over valve device 11, a quick service modifying or limiting valve device 12, a reservoir release valve device 13, a safety valve device 14, a release insuring valve device 15, a retainer valve device 19, a combined cut-out cock and centrifugal dirt collector 94 and other devices not shown which have no particular bearing on the present invention.

The brake controlling valve mechanism may comprise a pipe bracket 21 having gasket faces 22 and 23 disposed opposite each other and further comprises an equalizing valve device 24 and an emergency valve device 25.

The equalizing valve device 24 comprises a casing which is clamped to the gasket face 22 of the pipe bracket by any desired means, there being a gasket 26 interposed between the face 22 and the clamping face of the casing. The casing has formed therein a piston chamber 27 containing a piston 28 having a stem 29 adapted to operate a main slide valve 30 and an auxiliary slide valve 31 contained in a valve chamber 32 which is connected to the auxiliary reservoir 2 through a passage and pipe 33. The brake pipe 1 is connected to the piston chamber 27 by way of a branch pipe 97, a device 94, a passage 98, a chamber 95, and a strainer device 96 contained in the chamber 95.

The cut-in valve device 10 is associated with the equalizing valve device and is mounted in the casing thereof. This valve device is provided for the purpose of cutting the relay valve device 7 into action in effecting an application of the brakes and may comprise a piston 161 having on one side a stem 162 adapted to operate a slide valve 163 contained in a valve chamber 164 which is normally connected through a passage and pipe 165 to the take-up cylinder 5, said passage 165 being normally connected to an application passage 125 by way of a branch passage 166, a cavity 167 in the slide valve 163 and a passage 168. The valve chamber is normally connected through a port 176 in the slide valve 163 to a passage 177 leading to the seat for the equalizing main slide valve 30, and the piston chamber 169 at the other side of the piston is connected through a passage 170 to the atmosphere. The piston chamber 169 contains a spring 171, which, at all times, tends to urge the piston to its normal position. The piston, on its stem side, is provided with a gasket 172, which is adapted to engage an annular seat rib 173 on the casing when the piston is in its normal position, so as to close communication from the valve chamber 164 to a space 174 surrounding the seat rib 173, which space is connected to the chamber 169 through a groove 175 which by-passes the piston.

The relay valve device 7 is provided for the purpose of controlling the supply of fluid under pressure to and the release of fluid under pressure from the brake cylinder 6. This relay valve device may be of any desired type, but as shown in Fig. 1 of the drawings, is preferably of the same general type as the device disclosed in my prior application, Serial No. 740,202, filed August 17, 1934, and in the joint application of Clyde C. Farmer and myself, Serial No. 743,546, filed September 11, 1934. Since this type of relay valve device has been fully described in these two pending applications, a detailed description here of the device is deemed unnecessary. However, the following brief description of the device will be of assistance in understanding the invention.

Briefly described, the relay valve device 7 comprises a casing having a piston chamber 186 containing a piston 187. The chamber 186 is connected through a passage and pipe 188 to the volume reservoir 8 and to a passage 189 leading to the seat for the rotary valve 148 of the change-over valve device 11. The piston 187 is operative to control a supply valve mechanism to supply fluid under pressure from the supply reservoir 4 to the brake cylinder 6 and to control an exhaust valve mechanism to release fluid under pressure from the brake cylinder and to control both of said mechanisms to maintain any desired pressure in the brake cylinder, all of which has been fully described in the aforementioned pending application Serial No. 743,546.

All of the other devices of the brake equipment hereinbefore enumerated, may be substantially identical in every way with the corresponding devices of the equipment shown and described in the aforementioned pending application, Serial No. 743,546, and since these devices do not enter into the present invention, a detailed description of the devices is deemed unnecessary.

It will be understood that with but several exceptions, which will appear in the following description, the ports and passages in the equalizing valve device will be the same as shown and described in the pending application, Serial No. 743,546, but in the present application a number of these ports and passages have been omitted to simplify the showing of the invention, only those ports and passages being shown which are deemed necessary to a clear understanding of the invention.

*Initial charging with the change-over valve device in position to condition the equipment for passenger train operations.*

Assuming the change-over valve device 11 to be in position to condition the equipment for passenger train operations and the several parts and devices of the equipment to be in the position in which they are shown in Fig. 2, fluid under pressure supplied to the brake pipe 1 in the usual manner through the medium of the brake valve device (not shown), flows therefrom through pipe 97, the communication through the centrifugal dirt collector and cut-out cock device 94, passage 98, chamber 95 and strainer 96 to the equalizing piston chamber 27. From the chamber 27, fluid under pressure flows by way of the feed groove 259 to the equalizing valve chamber 32 and from thence flows through passage and pipe 33 to the auxiliary reservoir 2.

Fluid under pressure flows from the equalizing valve chamber 32 to the emergency reservoir 3 through a port 260 in the main slide valve 30, a passage 261, a port 265 in the change-over rotary valve 148, rotary valve chamber 146, and passage and pipe 147.

The other portions of the equipment are charged in the same manner as described in the aforementioned pending application, Serial No. 743,546.

With the several parts of the equalizing valve device in release position as shown in Fig. 2 of the drawings, the relay piston chamber 186 and volume reservoir 8 are connected to the atmosphere by way of pipe 188, passage 189, a cavity 266 in the change-over rotary valve 148, passages 226, 227 and 228, a cavity 267 in the equalizing main slide valve 30, a port 268, a cavity 269 in the auxiliary slide valve 31, a port 270 in the main slide valve 30, a passage 271, a cavity 272 in the change-over rotary valve 148, a passage and pipe 273, and retaining valve device 19.

The volume reservoir 8ª is connected to the atmosphere by way of a pipe and passage 400, a cavity 401 in the main slide valve 30 of the equalizing valve device and a passage 402. The take-up cylinder 5 is connected to the atmosphere by way of pipe and passage 165, cut-out valve chamber 164, port 176 in the cut-in slide valve 163, a passage 177, cavity 267 in the equalizing main slide valve 30 and the connections therefrom which have hereinbefore been traced.

With the relay piston chamber connected to the atmosphere, the relay piston 187 will be in release position as shown in Fig. 1 of the drawings, so that the brake cylinder 6 is connected to atmosphere by way of the release valve mechanism of the relay valve device.

*Service application of the brakes with the equipment conditioned for passenger train operations*

When it is desired to effect a service application of the brakes, a gradual reduction in brake pipe pressure is effected through the medium of the brake valve device, which reduction causes a corresponding reduction in the pressure of fluid in the equalizing piston chamber 27. The reduction in the pressure of fluid in chamber 27 will be at a faster rate than fluid under pressure can flow therefrom to the valve chamber 32 by way of the feed groove 259, so that the pressure of fluid in the valve chamber causes the equalizing piston 28, and thereby the main and auxiliary slide valves 30 and 31, respectively, to move to their extreme outer or application position, the auxiliary slide valve having a limited initial movement relative to the main slide valve. The auxiliary slide valve, as it is being moved relative to the main slide valve, laps the port 268 in the main slide valve, thereby closing the atmospheric communication from the volume reservoir 8, relay piston chamber 186 and cut-out valve chamber 164, and also uncovers a service port 274 in the main slide valve.

As the main slide valve is being moved to application position, it laps the passage 402, thus closing communication from the volume reservoir 8ª to the atmosphere.

With the main slide valve in application position, the service port 274 registers with the passage 125 and the cavity 401 in the main slide valve connects a passage 403 to the passage 400 leading to the volume reservoir 8ª, the passage 403 being connected to the passage 228 at the seated side of a ball check valve 404 which is interposed in the passage 228 at a point below the connection between the passages 227 and 228.

With the service port 274 in registration with the passage 125, fluid under pressure flows from the equalizing valve chamber 32 and connected auxiliary reservoir through said port and passage, a passage 168, a cavity 167 in the cut-in slide valve 163, a passage 166 and a passage and pipe 165 to the take-up cylinder 5. Fluid under pressure also flows to the cut-in slide valve chamber 164 through passage 165.

Fluid under pressure supplied to the take-up cylinder causes the piston and stem thereof to move outwardly and actuate the brake rigging to take up slack therein and to bring the usual brake shoes (not shown) into contact with the car wheels. The brake rigging as it is moved by the take-up cylinder device, draws the push rod of the brake cylinder 6 forwardly relative to the brake cylinder piston, said push rod being locked in its outermost position with relation to the brake cylinder piston when the piston is moved outwardly by fluid under pressure supplied by the relay valve device 7.

When the pressure in the take-up cylinder has been increased sufficiently to cause it to function in the manner just described, the pressure of fluid in the slide valve chamber 164 of the cut-in slide valve device 10 acting on that portion of the rear face of the piston 161 which is encircled by the seat rib 173, causes the piston and thereby the slide valve 163, to move outwardly against the resistance offered by the spring 171. As soon as the seal between the piston gasket and the seat rib 173 is broken, the entire area of the inner face of the piston 161 is subjected to the pressure of fluid in chamber 164, so that the piston and thereby the slide valve 163, will move with a snap action to their extreme outer or cut-in position.

The cut-in slide valve 163 as it is being moved toward its cut-in position by the piston 161, laps the passage 166, thereby cutting off communication from the auxiliary reservoir to the take-up cylinder 5 and laps the passage 165, thereby cutting off communication from the slide valve chamber 164 to the take-up cylinder, and also laps the passage 177, thereby cutting off communication between the chamber 164 and this passage. After the passages 165, 166 and 177 are lapped, the cavity 167 in the slide valve 163, which remains connected to the passage 168, is brought into communication with the passage 228 and maintains the connection between these passages when the slide valve is in its cut-in position. Further, as the slide valve is being moved toward its cut-in position and just before it reaches this position, it uncovers one end of a passage 293 to the slide valve chamber 164. The other end of the passage 293 has been previously uncovered by the equalizing slide valve chamber 32 upon movement of the equalizing main slide valve 30 to application position, so that fluid under pressure flows from the equalizing slide valve chamber and connected auxiliary reservoir to the cut-in slide valve chamber 164 and acts to maintain the cut-in piston and slide valve in their cut-in position.

With the cut-in slide valve in its extreme outer or cut-in position, fluid under pressure flows from the equalizing slide valve chamber 32 and connected auxiliary reservoir to the volume reservoir 8 and relay piston chamber 186, and to the volume reservoir 8ª. The flow of fluid to the volume reservoir 8 and relay piston chamber being by way of the service port 274 in the equalizing main slide valve 30, passages 125 and 168, cavity 167 in the cut-in slide valve 163, passage 228, past the ball check valve 404, passages 227 and 226, cavity 266 in the change-over rotary valve 148, passage 189 and pipe 188. From the passage 228 the flow of fluid to the volume reservoir 8ª is by way of passage 403, cavity 401 in the equalizing main slide valve 30 and passage and pipe 400. Thus, the reservoirs 8 and 8ª, in effect, serve to increase the volume of the relay piston chamber 186.

Fluid under pressure supplied to the relay piston chamber 186 causes the relay piston 187 to move inwardly from the position in which it is shown in Fig. 1, and as it is thus moved, first causes the exhaust valve mechanism to function to close the exhaust communication from the brake cylinder 6 and then causes the supply valve mechanism to function to supply fluid under pressure from the supply reservoir 4 to the brake cylinder.

*Full release of the brakes after a service application with the equipment conditioned for passenger train operations*

A full or complete release of the brakes is accomplished in substantially the same manner as with the equipment covered in the aforementioned pending application, Serial No. 743,546, and in view of this a brief description here of the release of the brakes is all that is deemed necessary.

When the equalizing piston 28 and slide valves 30 and 31 have been moved to release position, as shown in Fig. 2, by an increase in brake pipe pressure in the usual manner, fluid under pressure is vented from the relay piston chamber 186 and volume reservoir 8 to the atmosphere by way of pipe 188, passage 189, cavity 266 in the change-over rotary valve 148, passages 226, 227 and 228, cavity 267 and port 268 in the equalizing main slide valve 30, cavity 269 in the auxiliary slide valve 31, port 270 in the main slide valve, passage 271, cavity 272 in the change-over rotary valve 148, passage and pipe 273 and retaining valve device 19. Fluid under pressure is also vented from the cut-in slide valve chamber 164 to the atmosphere by way of passage 293, cavity 267 in the equalizing main slide valve 30, and the communication from said cavity to the atmosphere just traced.

With the slide valves in release position, fluid under pressure is vented from the volume reservoir 8ª to the atmosphere by way of pipe and passage 400, cavity 401 in the equalizing main slide valve 30 and passage 402.

When fluid under pressure is vented from the relay piston chamber 186 the relay valve device is caused to function to vent fluid under pressure from the brake cylinder.

When the pressure of fluid in the cut-in valve chamber 164 has been reduced, by the flow of fluid through the passage 293 to the atmosphere, slightly below the pressure of the compressed spring 171, said spring acts to shift the piston 161 and thereby the slide valve 163 to their innermost or release position, in which fluid under pressure is vented from the take-up cylinder 5 by way of pipe and passage 165, valve chamber 164, port 176 in the slide valve 163, passage 177 and cavity 267 in the equalizing main slide valve 30, the passage 293 being lapped by the slide valve 163 when said valve is in its innermost or release position.

From the foregoing description it will be seen that the brakes are completely released.

*Graduated release of the brakes with the equipment conditioned for passenger train operations*

In passenger train operations, it is very desirable to be able to reduce the brake cylinder pressure in steps; in other words, to graduate the release of the brakes.

Assuming the several parts of the equipment to be in application position and it is desired to graduate the release of the brakes, the brake valve is first moved to release position to quickly increase the brake pipe pressure sufficiently to cause the parts of the equipment to move to release position, and is then moved to lap position, in which latter position the flow of fluid from the usual main reservoir (not shown) to the brake pipe is closed off.

With the several parts of the equalizing valve device in release position, fluid under pressure is vented from the volume reservoir 8 and relay piston chamber 186 of the relay valve device 7 and from the volume reservoir 8ª in the same manner as has already been described in connection with the full or complete release of the brakes. Upon the venting of fluid from the relay piston chamber, the relay valve device is caused to operate to initiate a reduction in brake cylinder pressure. Now when the brake valve is moved from release to lap position, it is obvious that there will be no further increase in brake pipe pressure, so that the pressure of fluid in the equalizing valve chamber 32 will be increased by the flow of fluid from the fully charged emergency reservoir 3 by way of pipe and passage 147, change-over rotary valve chamber 146, port 265 in the change-over rotary valve 148, restricted passage 264, passage 271 and port 260 in the equalizing main slide valve 30.

Now when the pressure of fluid in the valve chamber 32 slightly exceeds the brake pipe pressure in the equalizing piston chamber 27, fluid under pressure in said chamber 32 causes the piston 28 and auxiliary slide valve 31 to move outwardly relative to the main slide valve 30. The piston and slide valve move but a very short distance when the slide valve laps the port 260 and thereby closes off the flow of fluid from the emergency reservoir to the valve chamber 32, and since, with the port 260 closed, no further increase in the pressure of fluid will be effected, the piston and auxiliary slide valve will come to a stop.

At substantially the same time as the port 260 is lapped, the auxiliary slide valve 31 also laps the port 268 in the main slide valve 30 and thus closes off the exhaust flow of fluid from the volume reservoir 8 and relay piston chamber 186. With the exhaust flow of fluid from the relay piston chamber closed off, the relay valve device operates to close off the flow of fluid from the brake cylinder.

When it is desired to make another step reduction in brake cylinder pressure, the brake valve may be moved from lap to running position, and when the reduction in brake cylinder pressure is attained, said valve is returned to lap position. The increase in brake pipe pressure effected upon movement of the brake valve to running position, causes the piston 28 and thereby the auxiliary slide valve 31, to be shifted to release positions, in which the port 268 is again connected with the port 270, thus permitting fluid under pressure to flow from the volume reservoir 8 and relay piston chamber 186, and in which the port 260 is again uncovered, permitting fluid under pressure to flow from the emergency reservoir to the slide valve chamber 32, this reduction in the pressure of fluid in the relay piston chamber causing the relay valve device to function to effect a corresponding reduction in brake cylinder pressure. With the brake valve in lap position, the equalizing piston and auxiliary slide valve will again be shifted to close off the flow of fluid from the volume reservoir 8 and relay piston chamber, so that the relay valve device will be caused to function to close off the flow of fluid from the brake cylinder.

In graduating the release of the brakes, fluid under pressure in the cut-in slide valve chamber 164, maintains the several parts of the cut-in valve device in their outermost or cut-in position.

It is to be noted that in graduating the release of the brakes the equalizing main slide valve 30 does not move from its release position, so that the volume reservoir 8ª is completely depleted of fluid under pressure.

*Reapplication of the brakes following a partial release of the brakes with the equipment conditioned for passenger train operations*

It has hereinbefore been pointed out, that to bring a train to a gentle stop, it is the usual practice to first effect a heavy application of the brakes, then partially release the brakes, then effect a reapplication of the brakes and finally release the brakes gradually, so that when the train comes to a stop the brake cylinder pressure will be only that required to hold the train stationary.

When it is desired to effect a reapplication of the brakes following a partial release of the brakes, the brake valve is moved to service position to effect a reduction in brake pipe pressure, and when the required reduction is effected, may be moved to lap position or may be moved between lap and running position to effect the gradual release of the brakes.

Upon effecting a reduction in brake pipe pressure, the several parts of the equalizing valve device move to application position.

With the equalizing main slide valve 30 in application position, fluid under pressure flows from the equalizing valve chamber 32 and connected auxiliary reservoir to the volume reservoir 8ª by way of the service port 274 in the equalizing main slide valve, passages 125 and 168, cavity 167 in the cut-in slide valve 163, which slide valve is still in its outer or cut-in position, passages 228 and 403, cavity 401 in the equalizing main slide valve 30 and passage and pipe 400. It will be noted that the ball check valve 404 will prevent the flow of fluid under pressure from the partially charged volume reservoir 8 and relay piston chamber 186 to the volume reservoir 8ª when the cavity 401 establishes communication from the equalizing piston chamber and the reservoir 8ª.

Now when the pressure of fluid in passage 228 at one side of the ball check valve 404 is slightly in excess of the pressure of fluid in the volume reservoir 8 and relay piston chamber 186 and present in the passage 228 above the ball check valve, fluid under pressure will flow from the passage 228 past the valve to the volume reservoir 8 and relay piston chamber and to the volume reservoir 8ª, the flow of fluid from the passage 228 to the volume reservoir 8 and relay piston chamber being by way of passages 227 and 226, cavity 266 in the change-over rotary valve 148, passage 189, and pipe 188.

It will be noted that since the flow of fluid from the equalizing valve chamber 32 is to the volume reservoir 8ª until the pressure of the reservoir is slightly in excess of the pressure of fluid in the partially charged volume reservoir 8 and relay piston chamber 186, the increase in the pressure of fluid in the volume reservoir 8 and relay piston chamber 186 and consequently in the brake cylinder 6 for a chosen reduction in brake pipe pressure, will be less than if the volume reservoir 8ª were omitted, thus an excessive increase in brake cylinder pressure is prevented.

It will be noted that with the change-over rotary valve 148 in position to condition the equipment for express train service, as shown in Fig. 3, or in position to condition the equipment for freight train service, as shown in Fig. 4, the passage 271 is lapped, so that the graduating feature of the equalizing valve device is cut-in. With the change-over valve 148 in either of these two positions, the volume reservoir 8 and relay piston chamber 186 is connected to the atmosphere in releasing the brakes in the same manner as described in the aforementioned pending application, Serial No. 743,546, while the volume reservoir 8ª is connected to the atmosphere by means of the cavity 401 in the equalizing main slide valve 30, thus both volume reservoirs and relay piston chamber are completely vented to the atmosphere. By reason of this, the combined volumes of the reservoirs 8 and 8ª will be effective in effecting reapplications of the brakes.

From the foregoing description, it will be understood that the equipment of the present application differs from that of the pending application, Serial No. 743,546, only in the provision of means effective only when the equipment is conditioned for passenger train service for controlling the increase in brake cylinder pressure in effecting reapplications of the brakes after the brakes have been partially released, which means comprises the volume reservoir 8ª, pipe and passage 400, cavity 401 in the equalizing main slide valve, atmospheric passage 402, passage 403, and ball check valve 404.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, a brake controlling valve mechanism operative upon a reduction in brake pipe pressure to supply fluid under pressure to effect an application of the brakes and operative upon a following limited increase in brake pipe pressure to effect a partial release of the brakes and operative upon a reduction in brake pipe pressure following the partial release of the brakes to effect a reapplication of the brakes tending to increase the braking force to a degree according to the degree of reduction in brake pipe pressure, and means operative to limit the increase in braking force to a lesser degree.

2. In a fluid pressure brake, in combination, a brake pipe, a brake controlling valve mechanism operative upon a reduction in brake pipe pressure to supply fluid under pressure to effect an application of the brakes and operative upon a following limited increase in brake pipe pressure to effect a partial release of the brakes and operative upon a reduction in brake pipe pressure following the partial release of the brakes to effect a reapplication of the brakes tending to increase the braking force to a degree according to the degree of reduction in brake pipe pressure, and means controlled by the brake controlling valve mechanism to limit the increase in braking force to a lesser degree.

3. In a fluid pressure brake, in combination, a brake pipe, a brake controlling valve device operated upon a reduction in brake pipe pressure to supply fluid under pressure to a chamber to effect an application of the brakes and including a main slide valve and a graduating valve, a reservoir, and means for connecting said reservoir to said chamber upon operation of said valve device to effect an application of the brakes, said main slide valve being adapted to release position to connect said reservoir with the atmosphere.

4. In a fluid pressure brake, in combination, a brake pipe, a brake controlling valve device operated upon a reduction in brake pipe pressure to supply fluid under pressure to a chamber to effect an application of the brakes and including a main slide valve and a graduating valve, two reservoirs, and means for connecting said reservoirs to said chamber upon the operation of said valve device to effect an application of the brakes, said main slide valve being adapted in release position to connect one reservoir with the atmosphere and said graduating valve being adapted in release position to connect the other reservoir with the atmosphere.

5. In a fluid pressure brake, in combination, a brake pipe, a brake controlling valve mechanism operative upon a reduction in brake pipe pressure to supply fluid under pressure to effect an application of the brakes and operative upon a following limited increase in brake pipe pressure to effect a partial release of the brakes and operative upon a reduction in brake pipe pressure following the partial release of the brakes to effect a reapplication of the brakes tending to increase the braking force to a degree according to the degree of reduction in brake pipe pressure, and means operative to limit the increase in braking force to a lesser degree, said means comprising two normally vented reservoirs into which fluid supplied to effect the initial application of the brakes flows, and means for reducing the pressure of fluid in one reservoir to atmospheric pressure when the brake controlling valve mechanism is operated to effect the partial release of the brakes, said reservoir being adapted in effecting the reapplication of the brakes to alone receive the fluid supplied by the brake controlling valve mechanism until the pressure of fluid in said reservoir slightly exceeds the pressure of fluid retained in the other reservoir.

6. In a fluid pressure brake, in combination, a brake pipe, a brake controlling valve mechanism operative upon a reduction in brake pipe pressure to supply fluid under pressure to effect an application of the brakes and operative upon a following limited increase in brake pipe pressure to effect a partial release of the brakes and operative upon a reduction in brake pipe pressure following the partial release of the brakes to effect a reapplication of the brakes tending to increase the braking force to a degree according to the degree of reduction in brake pipe pressure, means operative to limit the increase in braking force to a lesser degree, said means comprising two normally vented reservoirs into which fluid supplied to effect the initial application of the brakes flows, and means for reducing the pressure of fluid in one reservoir to atmospheric pressure when the brake controlling valve mechanism is operated to effect the partial release of the brakes, said reservoir being adapted in effecting the reapplication of the brakes to alone receive the fluid supplied by the brake controlling valve mechanism until the pressure of fluid in said reservoir slightly exceeds the pressure of fluid retained in the other reservoir, and means for preventing backflow of fluid under pressure from said other reservoir to the first mentioned reservoir when the brake controlling valve mechanism is operated to effect a reapplication of the brakes.

7. In a fluid pressure brake, in combination, a brake pipe, a brake controlling valve mechanism operative upon a reduction in brake pipe pressure to supply fluid under pressure to effect an application of the brakes and operative upon a following limited increase in brake pipe pressure to effect a partial release of the brakes and operative upon a reduction in brake pipe pressure following the partial release of the brakes to effect a reapplication of the brakes tending to increase the braking force to a degree according to the degree of reduction in brake pipe pressure, and means operative to limit the increase in braking force to a lesser degree, said means comprising two normally vented reservoirs into which fluid supplied to effect the initial application of the brakes expands, means for completely venting one reservoir when the brake controlling valve mechanism is operated to effect the partial release of the brakes, and means for effecting the partial release of fluid under pressure from the other reservoir in effecting the partial release of the brakes, said completely vented reservoir alone providing the expansion volume for the fluid pressure supplied by the brake controlling valve mechanism when the mechanism is operated to effect a reapplication of the brakes until the pressure of fluid in the reservoir is increased at least equal to the pressure of fluid retained in the other reservoir.

8. In a fluid pressure brake, in combination, a brake pipe, a brake cylinder, a relay valve device operative by fluid under pressure for supplying fluid under pressure to the brake cylinder and operative upon the release of fluid under pressure therefrom for releasing fluid under pressure from the brake cylinder, two normally vented volume reservoirs, a brake controlling valve device operated upon a reduction in brake pipe pressure for supplying fluid under pressure to said reservoirs and relay valve device for actuating the relay valve device to supply fluid under pressure to the brake cylinder and operated upon a following limited increase in brake pipe pressure for partially reducing the pressure of fluid in one volume reservoir and relay valve device to effect a partial release of fluid under pressure from the brake cylinder and for completely venting the other volume reservoir, and operative upon a reduction in brake pipe pressure following the partial release of fluid under pressure from the brake cylinder to supply fluid under pressure to said reservoir and relay valve device, the flow of fluid to the completely vented volume reservoir limiting the increase in the pressure of fluid supplied to said other volume reservoir and relay valve device.

9. In a fluid pressure brake, in combination, a brake pipe, a brake cylinder, a relay valve device operative by fluid under pressure for supplying fluid under pressure to the brake cylinder and operative upon the release of fluid under pressure therefrom for releasing fluid under pressure from the brake cylinder, a normally vented volume reservoir, a brake controlling valve device operated upon a reduction in brake pipe pressure for supplying fluid under pressure to said reservoir and relay valve device for actuating the relay valve device to supply fluid under pressure to the brake cylinder and operated upon a following limited increase in brake pipe pressure for partially reducing the pressure of the actuating fluid supplied to the relay valve device to effect the operation of the relay valve device to partially reduce the pressure of fluid in the brake cylinder and for completely venting the volume reservoir and operative upon a reduction in brake pipe pressure following the partial release of fluid from the brake cylinder to supply fluid under pressure to said reservoir and partially charged relay valve device to cause the relay valve device to operate to supply additional fluid under pressure to the brake cylinder, the flow of fluid to the completely vented reservoir limiting the increase in the pressure of the actuating fluid supplied to the relay valve device.

10. In a fluid pressure brake, in combination, a brake pipe, a brake cylinder, a relay valve device operative by fluid under pressure for supplying fluid under pressure to the brake cylinder and operative upon the release of fluid under pressure therefrom for releasing fluid under pressure from the brake cylinder, a normally vented volume reservoir, a brake controlling valve device operated upon a reduction in brake pipe pressure for supplying fluid under pressure to said reservoir and relay valve device for actuating the relay valve device to supply fluid under pressure to the brake cylinder and operated upon a following limited increase in brake pipe pressure for partially reducing the pressure of the actuating fluid supplied to the relay valve device to effect the operation of the relay valve device to partially reduce the pressure of fluid in the brake cylinder and for completely venting the volume reservoir and operative upon a reduction in brake pipe pressure following the partial release of fluid from the brake cylinder to supply fluid under pressure to said reservoir and partially charged relay valve device to cause the relay valve device to operate to supply additional fluid under pressure to the brake cylinder, the flow of fluid to the completely vented reservoir regulating the increase in the pressure of the actuating fluid supplied to the relay valve device according to the pressure of the actuating fluid retained in the relay valve device.

11. In a fluid pressure brake, in combination, a brake pipe, a brake cylinder, a relay valve device operative by fluid under pressure for supplying fluid under pressure to the brake cylinder and operative upon the release of fluid under pressure therefrom for releasing fluid under pressure from the brake cylinder, a normally vented volume reservoir, a brake controlling valve device operated upon a reduction in brake pipe pressure for supplying fluid under pressure to said reservoir and relay valve device for actuating the relay valve device to supply fluid under pressure to the brake cylinder and operated upon a following limited increase in brake pipe pressure for partially reducing the pressure of the actuating fluid supplied to the relay valve device to effect the operation of the relay valve device to partially reduce the pressure of fluid in the brake cylinder and for completely venting the volume reservoir and operative upon a reduction in brake pipe pressure following the partial release of fluid from the brake cylinder to supply fluid under pressure to said reservoir and partially charged relay valve device to cause the relay valve device to operate to supply additional fluid under pressure to the brake cylinder, the flow of fluid to the completely vented reservoir limiting the increase in the pressure of the actuating fluid supplied to the relay valve device, and means for preventing back-flow of fluid under pressure from the relay valve device to said reservoir when the brake controlling valve device is moved to application position following the partial release of fluid under pressure from the brake cylinder.

12. In a fluid pressure brake, in combination, a brake pipe, a brake cylinder, a relay valve device operative by fluid under pressure for supplying fluid under pressure to the brake cylinder and operative upon the release of fluid under pressure therefrom for releasing fluid under pressure from the brake cylinder, a normally vented volume reservoir, a brake controlling valve device operated upon a reduction in brake pipe pressure for supplying fluid under pressure to said reservoir and relay valve device for actuating the relay valve device to supply fluid under pressure to the brake cylinder and operated upon a following limited increase in brake pipe pressure for partially reducing the pressure of the actuating fluid supplied to the relay valve device to effect the operation of the relay valve device to partially reduce the pressure of fluid in the brake cylinder and for completely venting the volume reservoir and operative upon a reduction in brake pipe pressure following the partial release of fluid from the brake cylinder to supply fluid under pressure to said reservoir and partially charged relay valve device to cause the relay valve device to operate to supply additional fluid under pressure to the brake cylinder, the flow of fluid being to the volume reservoir alone until the pressure of fluid in the reservoir is at least equal to the pressure of the retained fluid in the relay valve device and then being to both the reservoir and relay valve device.

ELLIS E. HEWITT.